United States Patent
McPheeters

(10) Patent No.: US 12,088,239 B2
(45) Date of Patent: Sep. 10, 2024

(54) BRACED TRUSS FOUNDATIONS FOR SINGLE-AXIS TRACKERS AND RELATED SYSTEMS AND METHODS

(71) Applicant: Ojjo, Inc., San Rafael, CA (US)

(72) Inventor: Greg McPheeters, Santa Cruz, CA (US)

(73) Assignee: Ojjo, Inc., San Rafael, CA (US)

( * ) Notice: Subject to any disclaimer, the term of this patent is extended or adjusted under 35 U.S.C. 154(b) by 463 days.

(21) Appl. No.: 17/489,522

(22) Filed: Sep. 29, 2021

(65) Prior Publication Data
US 2022/0103116 A1    Mar. 31, 2022

Related U.S. Application Data

(60) Provisional application No. 63/084,773, filed on Sep. 29, 2020.

(51) Int. Cl.
| | | |
|---|---|---|
| H02S 20/32 | (2014.01) | |
| F24S 25/617 | (2018.01) | |
| F24S 30/425 | (2018.01) | |
| F24S 30/00 | (2018.01) | |

(52) U.S. Cl.
CPC ........... *H02S 20/32* (2014.12); *F24S 25/617* (2018.05); *F24S 30/425* (2018.05); *F24S 2030/115* (2018.05); *F24S 2030/15* (2018.05)

(58) Field of Classification Search
CPC .......... F24S 25/617; F24S 25/70; F24S 25/13; F24S 25/65; F24S 25/12; F24S 30/425; F24S 2030/15
See application file for complete search history.

(56) References Cited

U.S. PATENT DOCUMENTS

| | | | |
|---|---|---|---|
| 10,069,455 B2* | 9/2018 | Corio | F24S 25/634 |
| 2013/0048582 A1* | 2/2013 | Kruse | F24S 30/425 |
| | | | 29/897.31 |
| 2015/0059826 A1* | 3/2015 | Reed | F24S 25/00 |
| | | | 136/246 |
| 2018/0111031 A1* | 4/2018 | Carney | A63B 69/0075 |
| 2018/0254740 A1* | 9/2018 | Corio | F16M 11/125 |
| 2019/0379323 A1* | 12/2019 | Au | H02S 20/32 |
| 2019/0390819 A1* | 12/2019 | Underwood | A47F 5/14 |
| 2020/0072505 A1* | 3/2020 | Hudson | F24S 50/20 |
| 2020/0076354 A1* | 3/2020 | West | F24S 25/13 |
| 2020/0076355 A1* | 3/2020 | Hudson | F24S 25/70 |
| 2020/0076357 A1* | 3/2020 | Cherukupalli | F24S 25/20 |
| 2020/0195191 A1* | 6/2020 | Melton | H02S 20/32 |
| 2021/0384864 A1* | 12/2021 | Wang | F24S 25/70 |
| 2022/0103116 A1* | 3/2022 | McPheeters | F24S 30/425 |
| 2022/0275971 A1* | 9/2022 | Eickhoff | F24S 23/74 |
| 2022/0357077 A1* | 11/2022 | Achaerandio Fernández | F16C 11/04 |

* cited by examiner

*Primary Examiner* — Ko-Wei Lin
(74) *Attorney, Agent, or Firm* — Phillip D. Mancini

(57) ABSTRACT

A truss foundation for single-axis trackers that distribute forces into the foundation through the torque tube. A truss adapter joins a pair of adjacent truss legs driven at angles to one another on either side of a tracker row so that the legs are perpendicular to the tracker torque tube. A third leg aligned with the torque tube is connected to the adapter to help resist axial forces in the torque tube. One or more collars placed on either side of a torque tube bearing include set screws to prevent axial slippage of the torque tube.

15 Claims, 10 Drawing Sheets

BRACED TRUSS FOUNDATIONS FOR SINGLE-AXIS TRACKERS AND RELATED SYSTEMS AND METHODS

CROSS-REFERENCE TO RELATED APPLICATIONS

This claims priority to U.S. provisional patent application No. 63/084,773 filed on Sep. 29, 2020, titled "BRACED TRUSS FOUNDATIONS FOR SINGLE-AXIS TRACKERS AND RELATED SYSTEMS AND METHODS", the disclosure of which is hereby incorporated by reference in its entirety.

BACKGROUND

The applicant of this disclosure has developed a truss foundation for supporting single-axis trackers and other structures known commercially as EARTH TRUSS. This foundation consists of a pair of legs straddling an intended tracker row that extend below and above ground at an angle to one another that are joined together with a truss cap or adapter to form a rigid A-frame-shaped structure. Each leg in this foundation is formed from a driven screw anchor and an upper leg section that is sleeved over a connector at the head of the anchor. The truss cap has a pair of similar connecting portions that are also received within respective upper leg sections. Connections to each upper leg with the truss cap and screw anchor are accomplished by crimping the upper leg where it overlaps the connectors and connecting portions of the screw anchors and truss cap respectively, although other connecting mechanisms may be used. EARTH TRUSS foundations are typically installed along an intended North-South tracker row but oriented in an East-West direction, that is, orthogonal to the intended axis of the torque tube.

One advantage that truss foundations provide over conventional monopile or H-pile foundations is that they convert lateral loads into axial forces of tension and compression. Single structural members are relatively good at resisting axial loads relative to their ability to resist bending. By contrast, H-piles are put into bending by these same forces and therefore must be oversized and driven deeper by comparison. By applying a more elegant technique to resist lateral loads, the truss foundation saves steel and reduces installation costs relative to H-piles. However, while trusses are very strong in the East-West and vertical directions, they are relatively weak in the direction of the torque tube. Forces oriented in this direction will tend to bend the truss foundation over. Although less common, forces along the torque tube may be present from static loading if the tracker row is oriented on a North-South slope as well as from translation of seismic forces through the torque tube.

In a conventional tracker where the torque tube rotates about its own axis inside a bearing assembly, the torque tube may slide axially through the bearings until it hits the motor where such movement is typically resisted in response to axial forces along the tube. Since the motor foundation is typically heavier duty than the foundations supporting the bearings, whether supported by trusses or with H-piles, one approach is to reinforce this foundation relative to other's in the row. With H-piles this is done by using a larger and heavier beam and driving that beam to a deeper embedment depth. With truss foundations, this may be done by using two parallel trusses or a so-called double truss, where each has two or more legs, making sturdier connections, and/or using heavier apex components to form the trusses. While this may work to resist axial forces as well as moments present at the drive motor, it requires additional expense, places excessive loads at the motor, and may require different work flows than installation and assembly of other trusses in the same row. When these costs are spread over a multi-gigawatt portfolio of solar tracker arrays, they become quite significant. Therefore, to address this problem, various embodiments of this disclosure provide systems and apparatuses for resisting axial loads along the tracker torque tube without imposing additional burden on the foundation supporting the tracker's drive motor by distributing such loads to multiple truss foundations in each row.

DETAILED DESCRIPTION

The following description is intended to convey a thorough understanding of the embodiments described by providing a number of specific embodiments and details involving A-frame foundations used to support single-axis solar trackers. It should be appreciated, however, that the present invention is not limited to these specific embodiments and details, which are exemplary only. It is further understood that one possessing ordinary skill in the art in light of known systems and methods, would appreciate the use of the invention for its intended purpose.

Figure 1A:
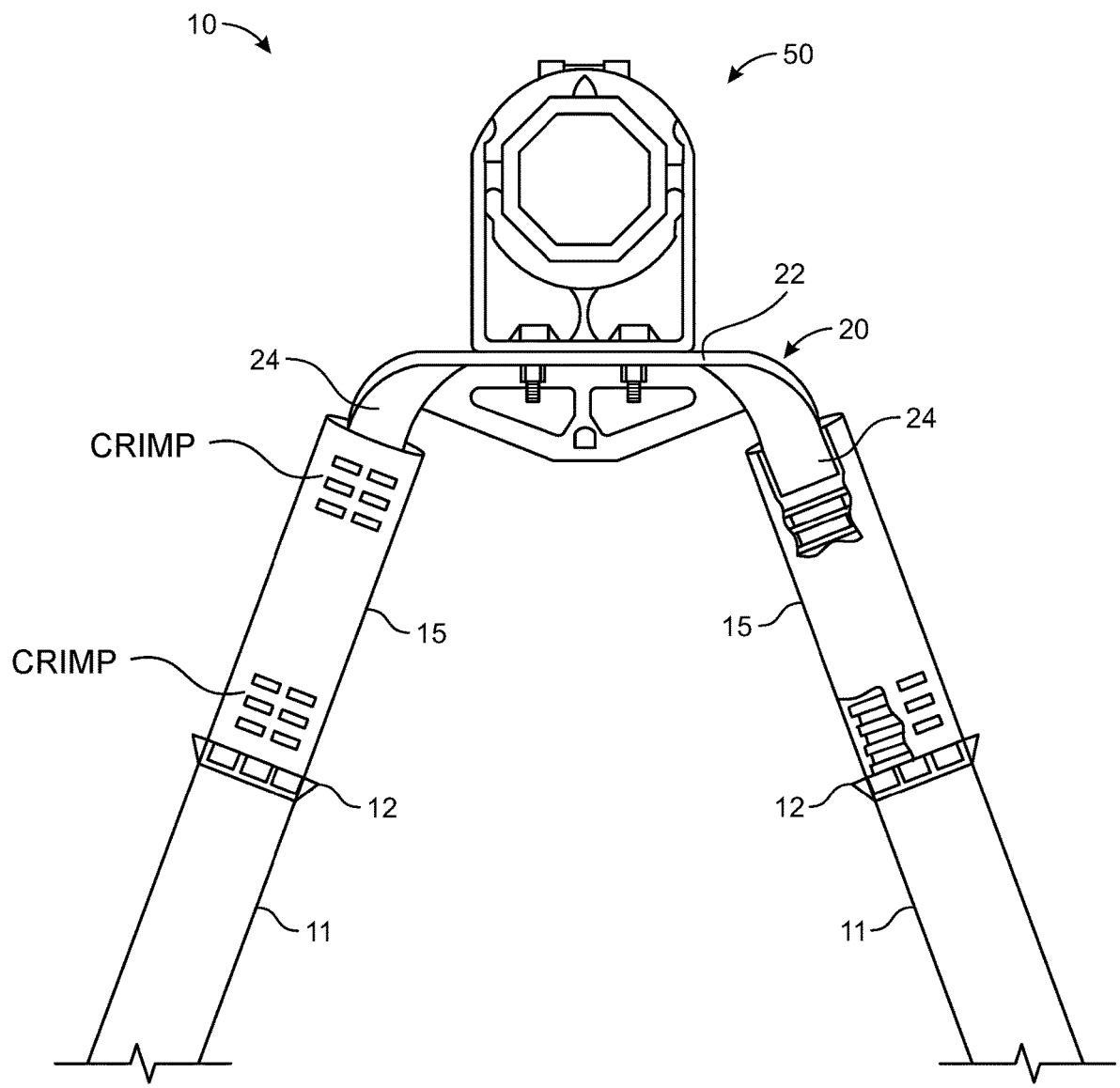
FIG. 1A shows a truss foundation supporting a torque tube bearing assembly in accordance with various embodiments of the invention.
Figure 1B:
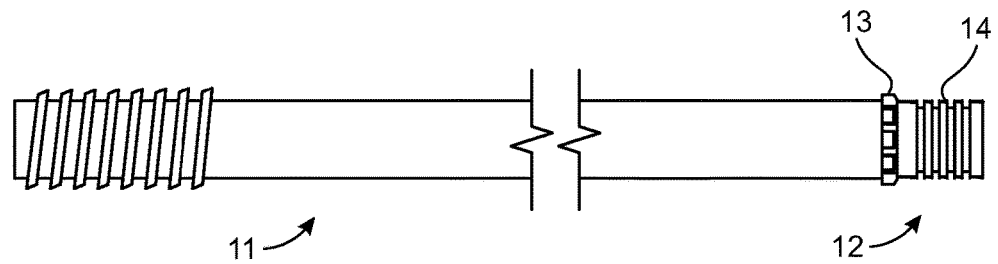
FIG. 1B shows a screw anchor component of a truss foundation such as the foundation shown in 1A.

Turning now to the Figures, FIG. 1A shows an exemplary EARTH TRUSS foundation such as that manufactured and sold by the Applicant of this disclosure, Ojjo, Inc. of San Rafael, California EARTH TRUSS foundation 10 consists of a pair of adjacent truss legs extending below and above ground. Each leg is made of lower screw anchor portion 11, the part that is driven into the ground, and upper leg section 15 that is sleeved over driving coupler 12 at the upper end of the screw anchor. Coupler 12 is used to drive the screw anchor 11 into the ground but also functions as an interface to connect to upper leg section 15. FIG. 1B shows a close-up of exemplary screw anchor 11 and coupler 12. Coupler 12 includes a ring of teeth or other suitable projections 13 and a connecting portion 14 that extends above ring 13. In various embodiments, connecting portion 14 is received in the open lower end of upper leg section 15. The free ends of each upper leg section 15 are joined with a so-called "truss cap" or adapter 20 that complete the truss. As shown, crimp joints are used to secure the connection between upper legs sections 15 and screw anchors 11 at the lower end and truss cap connecting portions 24 at the upper end. As the partial cutaway of the right truss leg in 1A shows, the crimper causes the leg to deform into the various channels in driving coupler 12 and similarly shaped connecting portion 24 of truss cap 20, securing it in place. It should be appreciated that in various embodiments, other connection means may also be used instead of crimping, however, crimping provides the advantage of not needing an additional fastener.

Figure 3A:
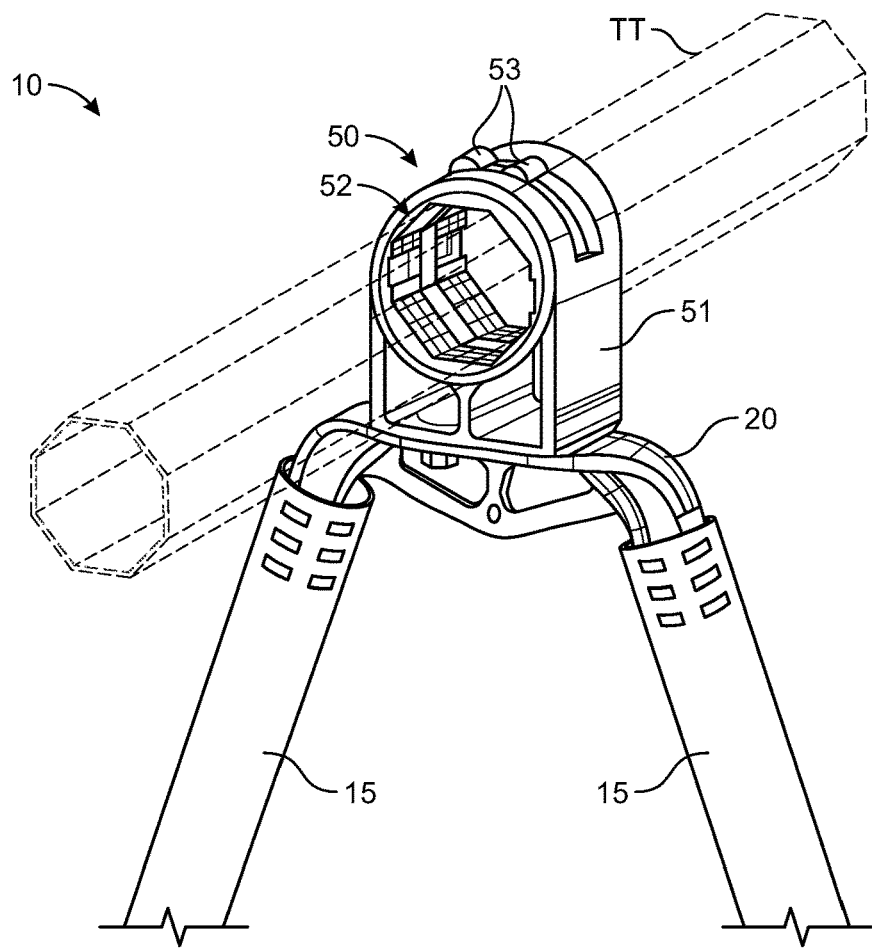
FIGS. 3A and 3B are perspective and side views respectively of a torque tube bearing assembly supported by a truss foundation in accordance with various embodiments of the invention.
Figure 3B:
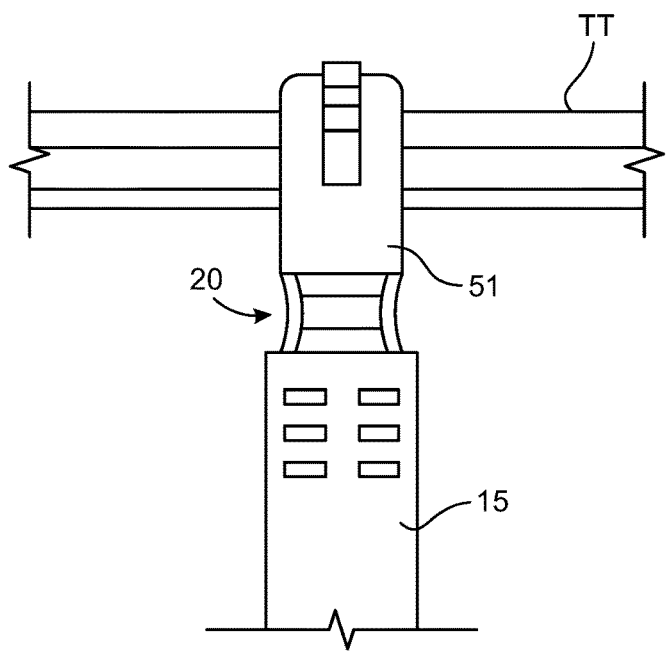

With continued reference to FIGS. 1A and 1B, as well as FIGS. 3A and 3B, truss cap 20 is a generally symmetric, one-piece cast component with an upper mounting surface 22 and a pair of opposing connecting portions 24. Connecting portions extend down and away from the mounting surface and intended to be received in respective ones of the adjacent upper leg portions 15. Truss cap 20 shown here is supporting torque tube bearing assembly 50. In this example, bearing assembly 50 is part of a DuraTrack HZ single-axis tracker manufactured and sold by Array Technologies, Inc. of Albuquerque, New Mexico. It should be appreciated that the principles discussed herein are equally applicable to other brands and types of single-axis trackers supported by truss foundations.

Dura Track bearing assembly 50 consists of base portion 51 and bearing 52. Bearing 52 receives a bearing insert made of a non-corrosive, somewhat compliant material that is able to rotate within the bearing as the torque tube TT rotates. Because ATI's torque tube is faceted, that is, it does not have a circular cross section but rather an eight-sided profile, the bearing insert has a faceted inside surface and rounded outside surface, thereby enabling the faceted torque tube to rotate smoothly within the bearing. A pair of stops 53 shown at the top of the assembly in FIG. 3A, limit the extent of rotation of the torque tube in both directions (e.g., Eastward and Westward) when they come in contact with the assembly at maximum tilt. These stops move in a slot as torque tube TT rotates. The ends of the slot correspond with the maximum allowable rotation of the tube to prevent over rotation from wind and other loads.

In the ATI tracker, dozens of these truss foundations and bearings are installed in a North-South oriented row spanning hundreds of feet. One foundation in the row will support either the torque tube drive motor or a center structure that transfers torque from a drive shaft to the tube. In the DuraTrack HZ tracker, a single drive motor rotates up to one megawatt of solar panels across several adjacent rows. Drive shaft sections extend from the row containing the motorized center structure to other center structures in successive adjacent rows across the array.

Figure 2A:
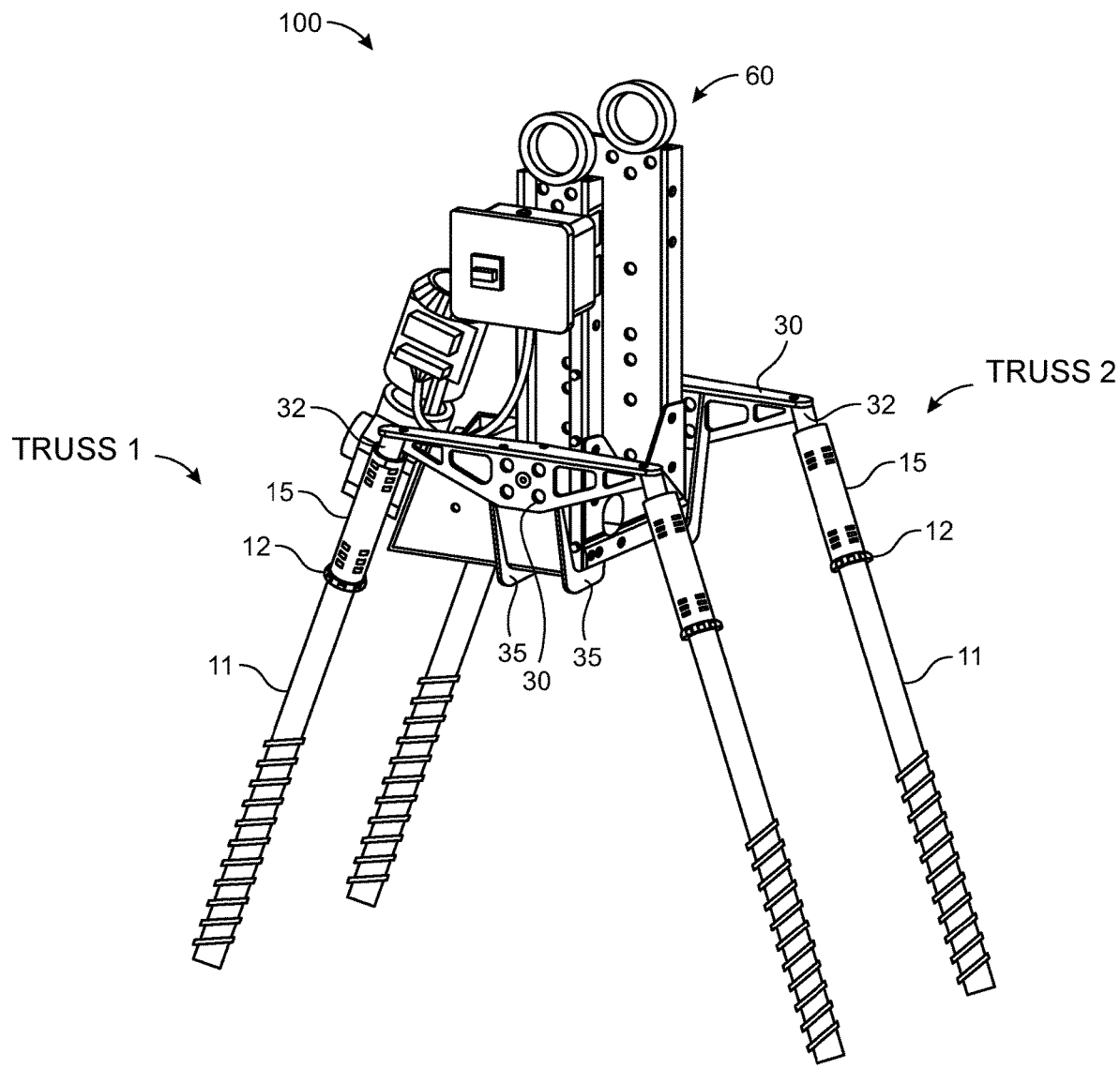
FIG. 2A shows a double motor or center structure truss in accordance with various embodiments of the invention.

FIG. 2A shows one possible configuration for supporting the ATI center structure and/or motorized center structure with double truss foundations. In FIG. 2A, the gear assembly that moves the torque tube has been omitted for ease of understanding. The gear assembly translates torque from the output shaft of the motor to the torque tube, causing it to slowly rotate as the output of the motor turns. Double truss foundations may be used to support the motor for several reasons. First, the weight of the motorized and non-motorized center structure assemblies is greater than that of the standard bearing assembly. Second, the motor serves as a brake against unintended rotation at all angles, not just the rotational extremes. Third, resistance to axial forces, that is, forces running with the torque tube, such as dead weight and forces generated from seismic activity are typically resisted by the motor because the torque tube may be free to slide through a bearing assembly but is usually prevented from doing so at the motor or center structure. For all of these reasons, it may be desirable or necessary to use a double truss such as that shown in FIG. 2 at the motorized and non-motorized center structures to withstand the forces typically present at this location in the tracker row.

The ATI center structure double truss 100 shown in 2A consists of a pair of adjacent truss foundations, labeled Truss 1 and Truss 2 in the figure, are installed adjacent to one another. Trusses 1 and 2 support the center structure and drive motor assembly 60 from below. Each adjacent truss is formed by joining adjacent truss legs with center structure truss cap 30. Cradle brackets 35 straddle center structure truss caps 30 to form a drop ledge and center structure motor assembly 60 is attached to that ledge. Because the motor foundation must already resist greater forces than other foundations in the row due to the greater moments generated from lateral loads, various embodiments of this disclosure seek to offload and distribute some of the forces across foundations supporting the bearing assembly in each row of the array.

Figure 2B:
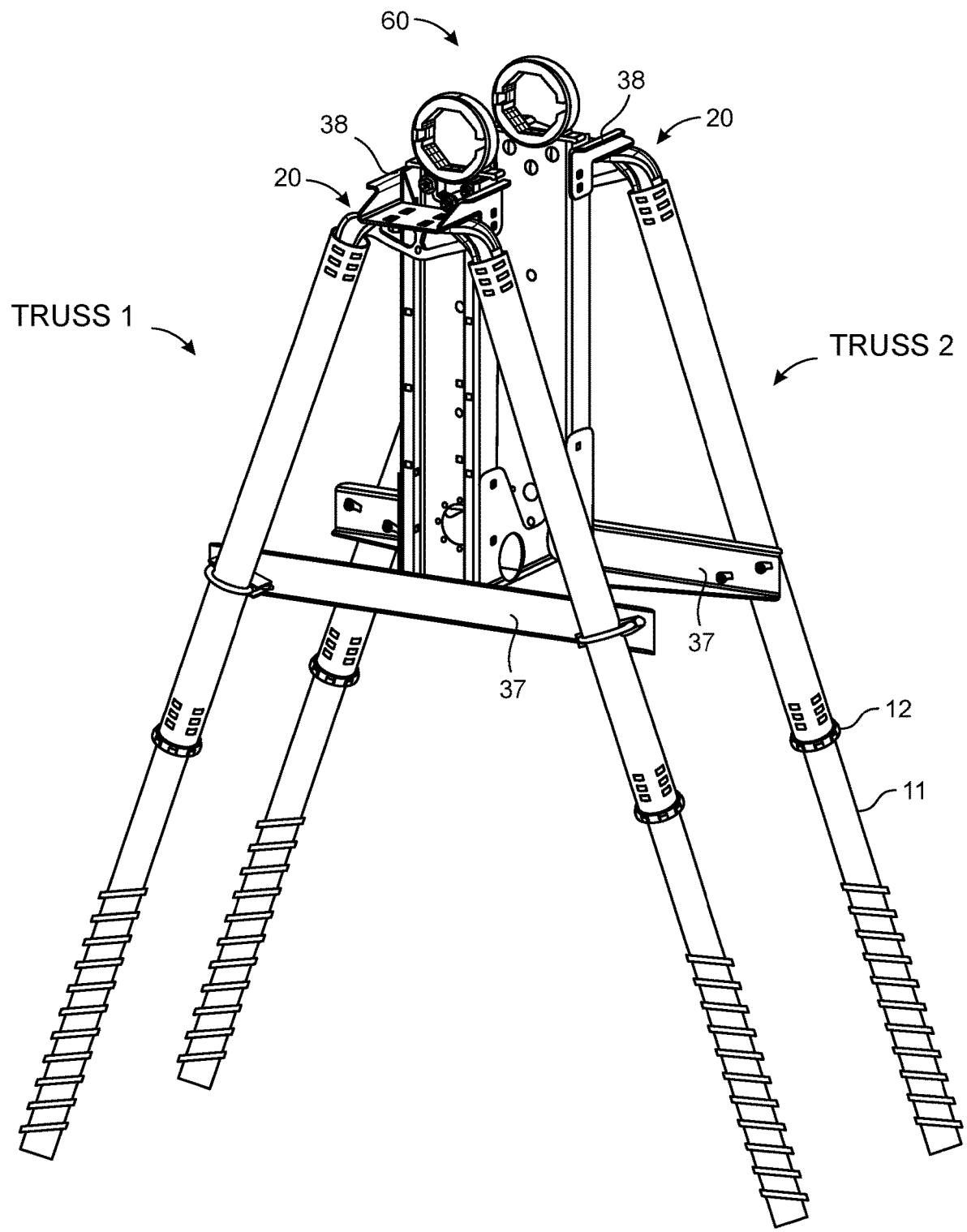
FIG. 2B shows another double motor or center structure truss in accordance with various other embodiments of the invention.

FIG. 2B shows another possible double-truss design for supporting the torque tube drive motor or center structure assembly. In this example the motor has been stripped away from assembly 60. A pair of cross braces 37 extend between each pair of legs of Truss 1 and Truss 2. Instead of using a special motor support truss cap such as truss cap, the double truss foundation in 2B uses all the same components of a conventional truss supporting a bearing assembly with standard truss cap 20. Two such trusses are assembled in proximity to one another along the tracker row. Cross braces extend between the legs of each truss. Apex brackets 38 are mounted to the top mounting surface 22 of each truss can and attached to assembly 60 enable it hang from the top of Truss 1 and Truss 2.

FIGS. 3A and 3B show perspective and side views respectively of a portion of the ATI bearing assembly supported by a truss foundation such as that shown in FIG. 1A. Torque tube TT passes through bearing 52 along a North-South axis that in various embodiments is substantially perpendicular to each truss leg and to the East-West oriented truss formed by the legs and truss cap. As discussed in the context of FIG. 1A, lateral loads impingent on the array will be translated in the truss legs as axial forces of tension and compression except when the array is at maximum tilt in either direction. As for forces oriented along the axis of the torque tube (e.g., dead loads and seismic loads for example), the truss foundation is not good at resisting these loads because they are orthogonal to the truss and therefore put the legs into bending. In some cases, the tracker system may allow the tube to slide through the bearing until it reaches the motor pile or other structure that prevents lateral movement to enable the foundation supporting the motor to resist them. This may cause each foundation to begin to lean along the axis of the torque tube. Therefore, various embodiments of the invention provide systems and structures for preventing either of these situations from occurring without putting additional burden on the truss foundation supporting the torque tube drive motor.

To that end, FIGS. 4A-D show truss foundation 200 according to various embodiments of the invention that provides weak axis support (i.e., X-axis or North-South oriented axis) without subjecting the motor truss to additional forces or requiring it to resist significant weak-axis forces. Truss 200 shown in these figures relies on a standard two-leg configuration that in various embodiments will support the ATI bearing assembly or a bearing assembly of any other tracker maker that relies on a bottom-up design where the torque tube rotates about its own axis. It should be appreciated that different tracker systems may require different truss caps and or different truss cap mounting surfaces. These variations are within the spirit and scope of the various embodiments of the invention. In the example of FIGS. 4A-D, the pair of adjacent legs of the truss are joined together with truss cap 250 that may, in some embodiments, be a standard truss cap with upper mounting surface 251 and two opposing connecting portions 252 that received respective upper leg sections 15. In other embodiments, truss cap 250 may have a third connecting portion 255 that is part of the single casting. In addition, truss foundation 200 includes a third leg that is oriented with the torque tube that leans towards the truss foundation. This third leg consists of a driven screw anchor that is substantially identical to the other screw anchors, with an upper leg portion that is connected to, in this case crimped onto, connecting portion 255 that is connected to truss cap 250. In various embodiments, connecting portion 255 may be attached to any truss cap. That is, the truss cap may have a feature, such as a one or more openings, that enable connecting portion 255 to be bolted to it. In this way, connecting portions may be added to any truss caps in the row as needed without requiring a non-standard part. In other embodiments, third connecting portion 255 may be built into the truss cap as a single casting as a special purpose truss cap for providing weak axis support along the axis of the torque tube. In still further embodiments, third connecting portion 255 may attach to the truss cap using the same bolts that attach bearing assembly 50 to truss cap 250. This may be preferrable because it does not require any additional fasteners. In other words, the bolts passing through the truss cap from the bearing assembly may also support connecting portion 255. A pinned (hinged) connection may be preferrable to accommodate different leg angles of the third leg.

Continuing with FIGS. 4A-D, a pair of set screw collars 260 may surround the torque tube on either side of bearing assembly 50. Collars 260 may be slipped over from the end of the torque tube, or if configured as two-pieces, may be attached to the torque tube as shown, for example, in FIGS. 5A-E. In various embodiments, the inside geometry of collars 260 matches the cross-sectional geometry of the torque tube. So, in the example of FIGS. 4A-D, they have a faceted or fluted cross section to match the ATI torque tube. In other embodiments, they may have a circular cross section or other cross section depending on the cross-sectional geometry of the torque tube. Each collar 260 may have several threaded set screw openings 261 with seated set screws 262 passing through the collar from the outside surface to the torque tube. These screws are tightened using a screw driver or power driver until they butt up against or, in some cases, penetrate into the surface of the torque tube. If each set screw provides X-hundred pounds of resistance to movement, then the combined total resistance will be the number of screws times X. For example, if each set screw provides 300 pounds of resistance, with eight screws, twenty-four hundred (2400) pounds of resistance may be achieved in both directions. When an axial load or force is placed on the torque tube, the tube will be prevented from slipping through the bearing by the collars. The force is then translated down into the third leg as either tension or compression, depending on the direction, trying to pull out or drive in the screw anchor of the third leg. Because single structural members are relatively good at resisting axial forces relative to their ability to resist bending, the third leg is effective at preventing distortion of truss 200 and other two-legged trusses in the same row. In various embodiments, a truss similar to truss 200 shown in FIGS. 4A-D is placed at multiple positions in each row. In some embodiments it may be placed on either side of the center structure since that is the position with the greatest magnitude of loads or forces along the torque tube. In other embodiments, collars such as collars 260 may be used at one or more different trusses along the tracker row.

Figure 4A:
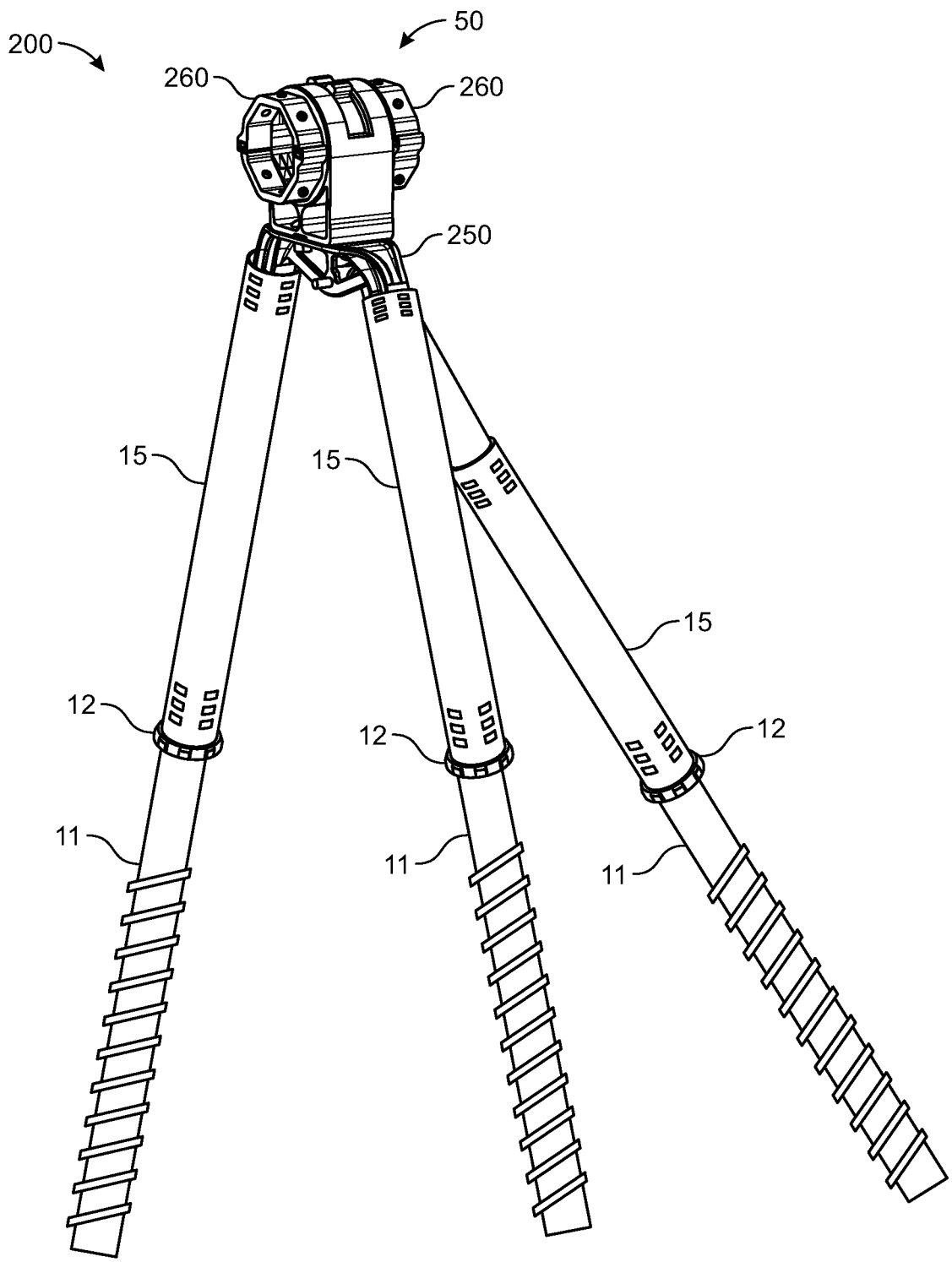
FIG. 4A is a perspective view of a three-legged truss in accordance with various embodiments of the invention.
Figure 4B:
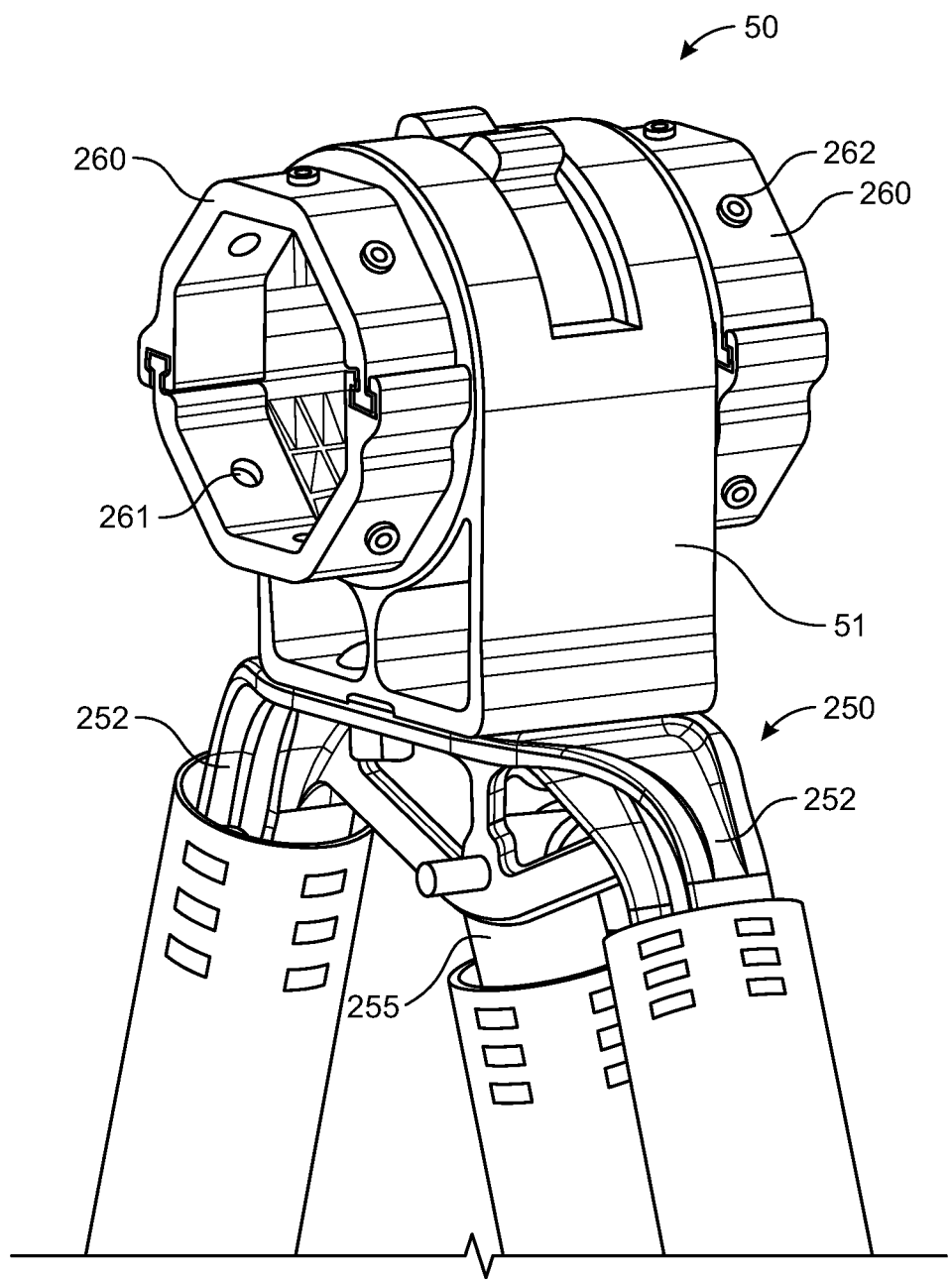
FIG. 4B is a close-up front perspective view of a portion of the three-legged truss shown in FIG. 4A.
Figure 4C:
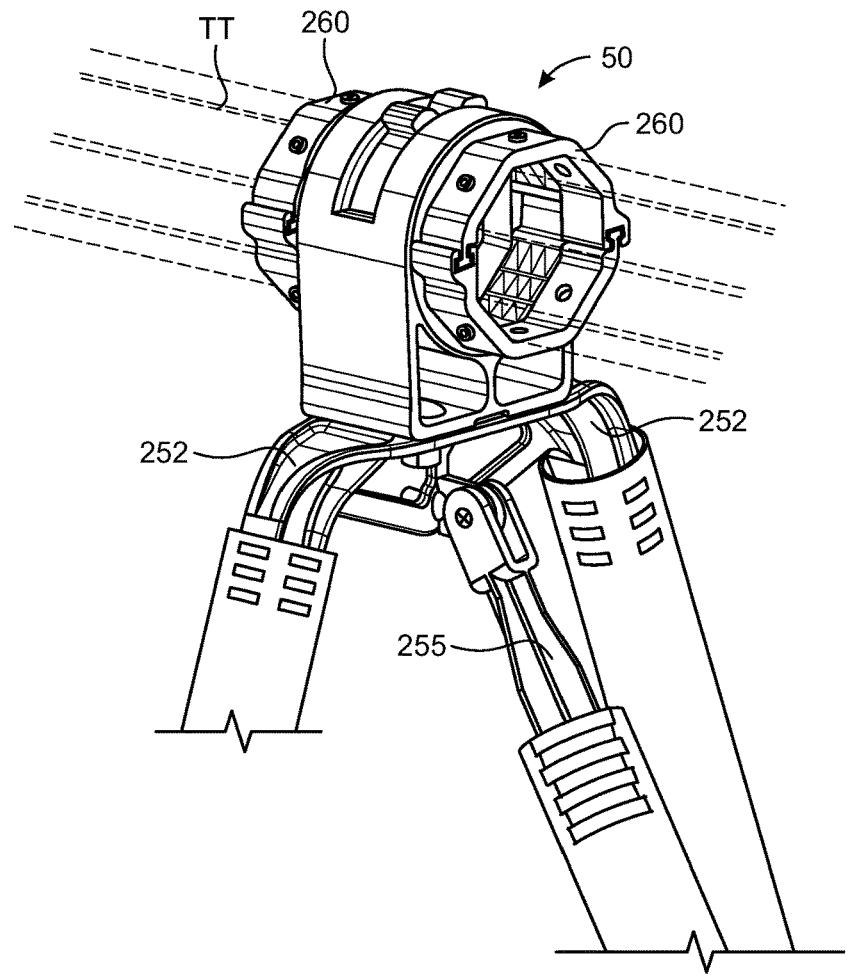
FIG. 4C is a close-up rear perspective view of a portion of the three-legged truss shown in FIG. 4A.
Figure 4D:
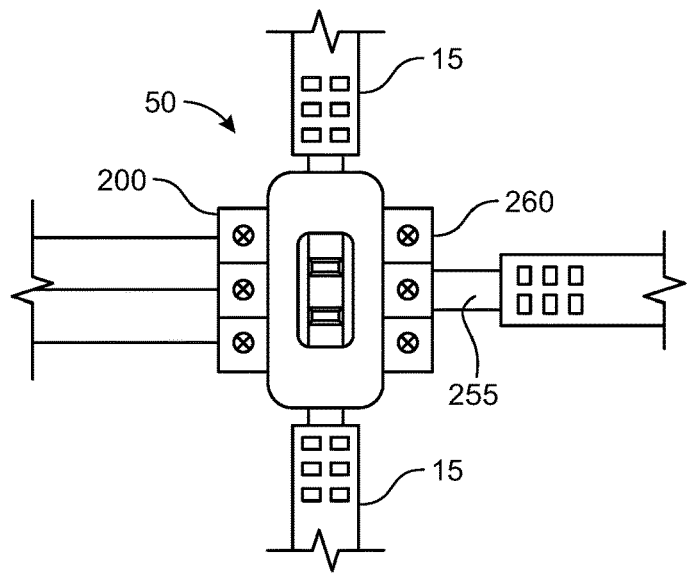
FIG. 4D is a top view of the portion of the three-legged truss shown in FIG. 4A.

FIG. 4D shows the alignment of the third truss leg with respect to the truss foundation. The torque tube has been removed from the South side of the bearing assembly so that the third leg may be seen. The third leg is not parallel to the torque tube but rather is aligned with it, leaning into the truss foundation formed by the two adjacent truss legs and truss cap. In other words, when looking into the Z-axis, the third leg has zero angle of incidence in the East or West direction. When looking into the East-West axis, the third leg has a non-zero angle of incidence in the Z-direction. The angle may be the same as the two legs making up the truss or may be set at a different angle that is better suited for translating forces along the torque tube into tension and compression, such as, for example, 60-degrees. The hinged connection between third connecting portion 255 and truss cap 250 may enable truss cap to accommodate a range of different angles for the third angle without needing to know the desired angle prior to truss assembly.

Turning now to FIGS. 5A-5E, these figures show various styles of set screw collars according to various embodiments of the disclosure. Starting with 5A, this figure shows collar 270 which is a two-piece clam-shell design according to some embodiments. Collar 270 is installed by placed one half of body 272 over the torque tube and the other half 272 under it. In various embodiments, body portions 272 may be symmetric to minimize part counts and simply installation. Bolts 273 pass through both halves and are tightened with nuts to secure it to the torque tube. Then, set screws 274 seated in openings 271 are tightened until they engage the torque tube. This may be done on both sides of the bearing assembly to prevent axial slippage of the torque tube through the bearing in response to forces along the weak-axis (i.e., X-axis or North-South axis). Opposing flanges on each half 272 enable respective bolts 273 or other fasteners to pass through both halves to form a unitary structure around the torque tube.

Figure 5A:
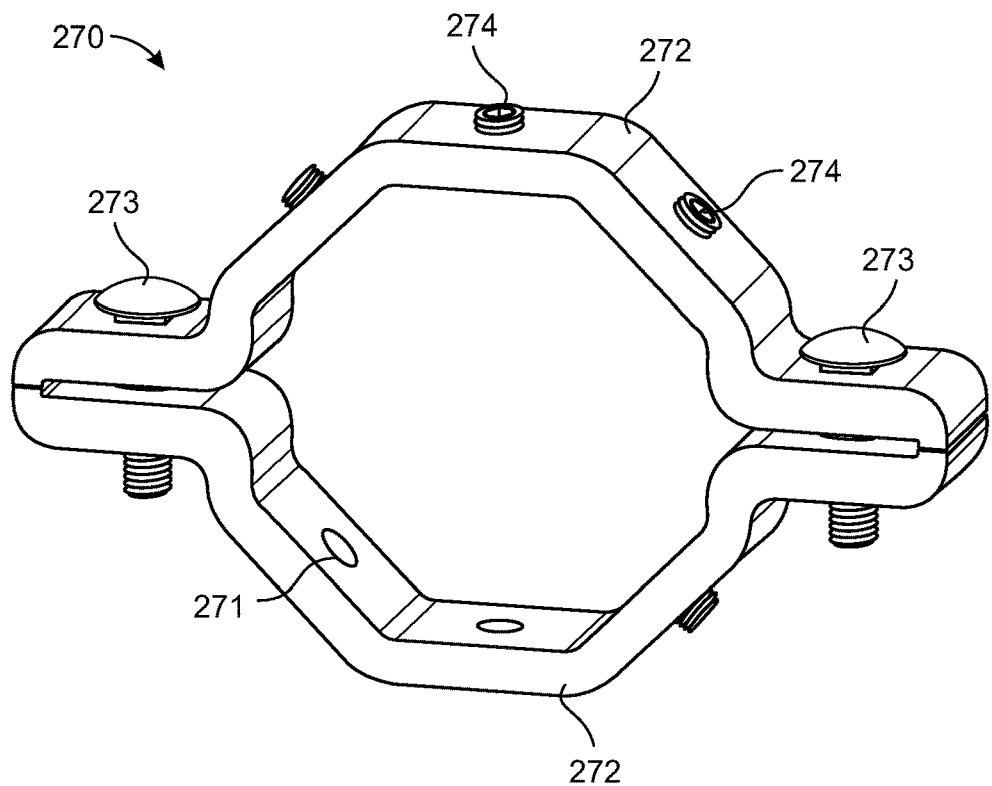
FIG. 5A shows a torque tube bearing collar according to various embodiments of the disclosure.
Figure 5B:
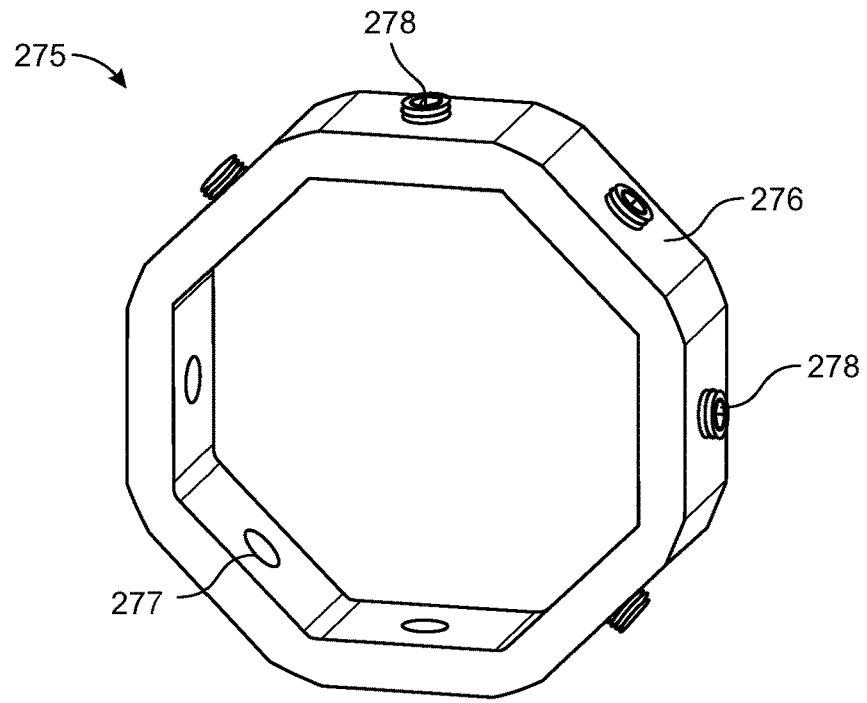
FIG. 5B shows another torque tube bearing collar according to various embodiments of the disclosure.
Figure 5C:
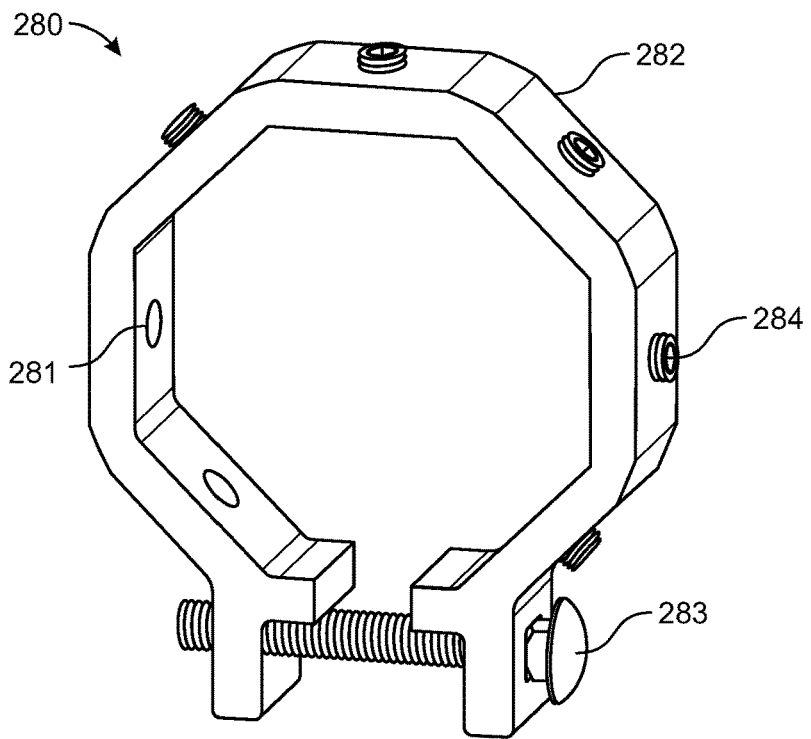
FIG. 5C shows an additional torque tube bearing collar according to various embodiments of the disclosure.
Figure 5D:
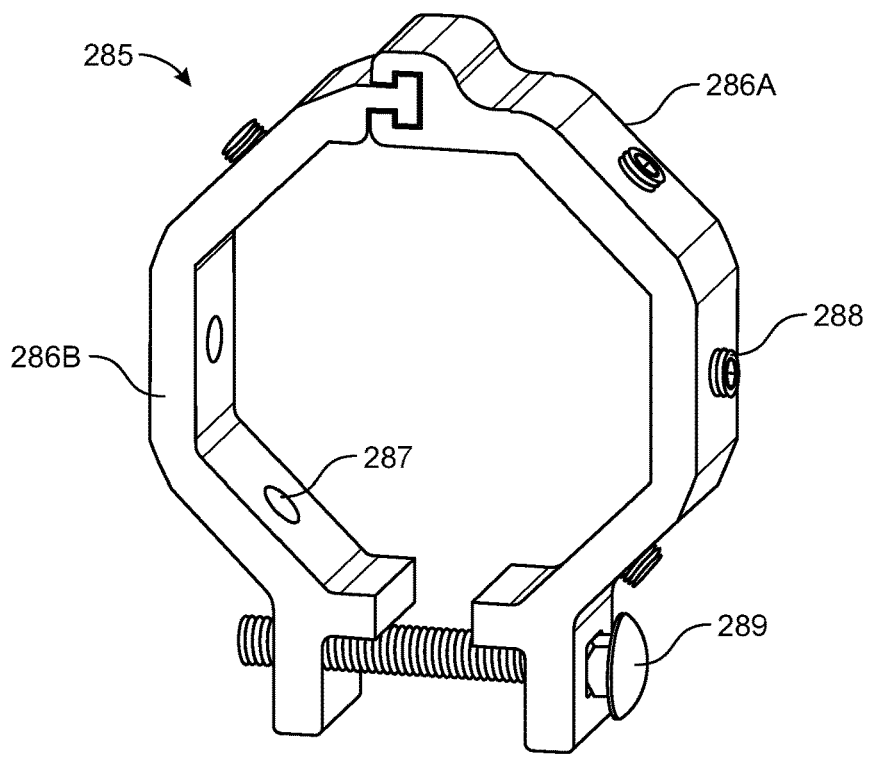
FIG. 5D shows still a further torque tube bearing collar according to various embodiments of the disclosure.
Figure 5E:
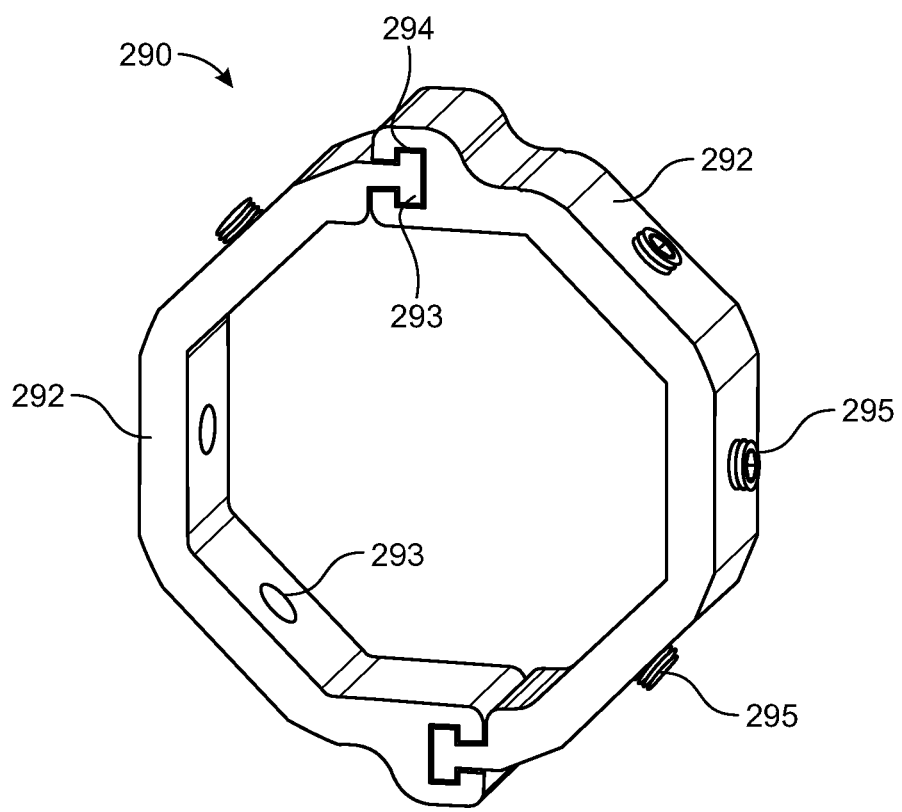
FIG. 5E shows an additional torque tube bearing collar according to various embodiments of the disclosure.

FIG. 5B shows another collar 275 according to various embodiments of the disclosure. Collar 275 is a one-piece collar consistent with that shown in FIGS. 4A-D. Collar 275 may be relatively less expensive to manufacture than other designs but may also be the most difficult to install because one must be slipped onto the torque tube from each end. Multiple threaded openings may be distributed around the one-piece body 276. Once in place, set screws 278 are torqued down via threaded openings 277 to fix the collar to the tube. Collar 280 shown in 5C is similar to that in 5B but may be somewhat easier to install because it has an opening that changes the internal dimensions of the collar. By default, it is opened wider than the torque tube to enable it slide along the torque tube more easily than the collar in 5B but may then be compressed by threading a retaining nut onto bolt 283 spanning the opening to reduce the internal dimensions to roughly match the external dimensions of the torque tube. Then, set crews 284 are torqued into threaded openings 281 to lock collar 280 into place on the torque tube. FIG. 5D shows a variation on the collar of 5C. Collar 285 shown in 5C relies on bolt 289 to change the internal dimension of the collar, but is made of two halves 286A, 286B that are joined by sliding one laterally into the other via a male to female connection. The female half 286A has a T-slot formed in it while the male half 286B has a T shaped projection is inserted into the T-slot of half 286A. Once joined, bolt 289 is passed through both halves and a retaining nut tightened down to secure the collar in place on the torque tube. Set screws 288 are tightened into opening 287 to secure clamp 285 to the torque tube. FIG. 5E shows yet another variation of a retaining collar according to various embodiments of the disclosure. Collar 290 shown in 5E is also a two-piece design, however each half 292 is symmetric. Each symmetric half 292 terminates in a T at one end and a T-slot at the other, enabling both halves to be identical. This may simplify manufacturing and reduce part count and cost. Halves 292 are joined by sliding the T of one into the slot of the other while both halves surround the torque tube. Once positioned at the correct location, set screws 295 are torqued into openings 293 until they engage the torque tube. One collar may be assembled on each side of the torque tube bearing and pressed loosely against it before tightening each of set screws 295 in threaded openings 291 to enable the tube to rotate freely within the bearing while preventing axial slippage through the bearing. In conjunction with the three-legged truss foundation 200, collars such as those shown in FIGS. 5A-5E may eliminate weak axis concerns with truss foundations in tracker systems prone to forces along the axis of the torque tube (i.e., those in seismic locations and those subject to deadloads along the X-axis).

The embodiments of the present inventions are not to be limited in scope by the specific embodiments described herein. Indeed, various modifications of the embodiments of the present inventions, in addition to those described herein, will be apparent to those of ordinary skill in the art from the foregoing description and accompanying drawings. Thus, such modifications are intended to fall within the scope of the following appended claims. Further, although some of the embodiments of the present invention have been described herein in the context of a particular implementation in a particular environment for a particular purpose, those of ordinary skill in the art will recognize that its usefulness is not limited thereto and that the embodiments of the present inventions can be beneficially implemented in any number of environments for any number of purposes. Accordingly, the claims set forth below should be construed in view of the full breath and spirit of the embodiments of the present inventions as disclosed herein.

The invention claimed is:

1. A system comprising:
 a bearing assembly, comprising a bearing housing and a bearing insert rotatably supported within the bearing housing;
 a section of torque tube extending through the bearing insert;
 a pair of collars surrounding the section of torque tube proximate opposing sides of the bearing housing; and
 a truss foundation, supporting the bearing assembly, the truss foundation comprising a pair of truss legs that are joined together by an adapter, wherein each collar of the pair comprises a plurality of set screws operable to extend into a surface of the section of torque tube.

2. The system according to claim 1, wherein the section of torque tube is substantially perpendicular to the truss foundation.

3. The system according to claim 2, wherein the adapter comprises a pair of connecting portions that are received into respective ones of the truss legs.

4. The system according to claim 2, wherein the truss foundation comprises a third truss leg that is not perpendicular to the torque tube.

5. The system according to claim 4, wherein the adapter comprises a third connecting portion that is received into the third truss leg.

6. The system according to claim 5, wherein the third connecting portion is hinged to the adapter to accommodate a plurality of different angles of the third truss leg.

7. A single-axis tracker comprising:
 a plurality of first truss foundations, each first truss foundation comprising two truss legs extending above and below ground joined together by a first adapter;
 at least one second truss foundation, the at least one second truss foundation comprising three truss legs extending above and below ground joined together by a second adapter; and
 a torque tube extending across the plurality of first truss foundations and the at least one second truss foundation, wherein the plurality of first truss foundations are substantially perpendicular to the torque tube and at least one truss leg of the at least one second truss foundation is not perpendicular to the torque tube.

8. The single-axis tracker according to claim 7, wherein each of the plurality of first truss foundations and the at least one second truss foundation supports a torque tube bearing assembly rotatably receiving the torque tube.

9. The single-axis tracker according to claim 8, wherein the torque tube bearing assembly comprises a bearing insert rotatably seated in a bearing and with the torque tube passing through the bearing insert.

10. The single-axis tracker according to claim 8, wherein the at least one second truss foundation further comprises a pair of collars surrounding the torque tube on opposing sides of the bearing assembly.

11. The single-axis tracker according to claim 10, wherein each collar comprises a plurality of set screws penetrating through the collar to the torque tube thereby preventing axial slippage of the torque tube through the bearing assembly.

12. The single-axis tracker according to claim 7, wherein each first adapter comprises a pair of connecting portions that are received into respective ones of the two truss legs.

13. The single-axis tracker according to claim 7, wherein the at least one second adapter comprises three connecting portions that are received into respective ones of the three truss legs.

14. The single-axis tracker according to claim 13, wherein two of the connecting portions are aligned with the first truss foundation and the third connecting portion is aligned with the torque tube.

15. A truss foundation comprising:
 a pair of adjacent truss legs extending below and above ground and angled toward one another on respective sides of a North-South oriented tracker row;
 an adapter having a pair of opposing connecting portions received in the truss legs to form the truss foundation with the pair of adjacent truss legs;

a third truss leg extending below and above ground through the tracker row and leaning toward the pair of adjacent truss legs;
a hinged connecting portion attached to the adapter received within the third truss leg;
a bearing assembly sitting on the adapter, the bearing assembly having a bearing with a bearing insert rotatably seated therein with a torque tube extending through the bearing insert to rotate within the bearing via the bearing insert; and
a pair of collars positioned around the torque tube on opposing sides of the bearing assembly, each collar having a plurality of set screws penetrating from an outer surface of the collar to the torque tube, thereby preventing axial slippage of the torque tube through the bearing.

* * * * *